(12) United States Patent
Horn et al.

(10) Patent No.: US 11,452,041 B2
(45) Date of Patent: Sep. 20, 2022

(54) UE AND BASE STATION PAPR REPORT

(71) Applicant: QUALCOMM Incorporated, San Diego, CA (US)

(72) Inventors: Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/105,371

(22) Filed: Nov. 25, 2020

(65) Prior Publication Data
US 2022/0167269 A1    May 26, 2022

(51) Int. Cl.
| | |
|---|---|
| *H04W 52/02* | (2009.01) |
| *H04W 52/22* | (2009.01) |
| *H04W 72/04* | (2009.01) |
| *H04W 52/28* | (2009.01) |
| *H04W 52/14* | (2009.01) |

(52) U.S. Cl.
CPC ..... *H04W 52/0229* (2013.01); *H04W 52/143* (2013.01); *H04W 52/225* (2013.01); *H04W 52/283* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 2014/0169188 A1* | 6/2014 | Arambepola | H04L 5/0044 370/252 |
| 2016/0065343 A1 | 3/2016 | Kim et al. | |
| 2016/0295528 A1* | 10/2016 | Gävert | H04W 52/28 |
| 2018/0294919 A1* | 10/2018 | Cheng | H04L 1/0058 |
| 2020/0052946 A1* | 2/2020 | Zou | H04L 27/2623 |

* cited by examiner

*Primary Examiner* — Jutai Kao
(74) *Attorney, Agent, or Firm* — Procopio, Cory, Hargreaves & S; Nerrie M. Zohn

(57) ABSTRACT

A configuration for optimized UE power efficiency based on a PAPR report. The apparatus establishes a connection with a base station. The apparatus transmits, to the base station, a PAPR report indicating one or more parameters to adjust the PAPR of each ADC of the UE. The apparatus receives, from the base station, a downlink signal based on the PAPR report of the UE.

58 Claims, 8 Drawing Sheets

UE AND BASE STATION PAPR REPORT

BACKGROUND

Technical Field

The present disclosure relates generally to communication systems, and more particularly, to a configuration for a peak to average power ratio (PAPR) report to optimize user equipment (UE) power efficiency.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a user equipment (UE). The device may be a processor and/or a modem at a UE or the UE itself. The apparatus establishes a connection with a base station. The apparatus transmits, to the base station, a peak to average power ratio (PAPR) report indicating one or more parameters to adjust the PAPR of each analog to digital converter (ADC) of a UE. The apparatus receives, from the base station, a downlink signal having an adjusted PAPR based on the one or more parameters provided by the UE.

In an aspect of the disclosure, a method, a computer-readable medium, and an apparatus are provided. The apparatus may be a device at a base station. The device may be a processor and/or a modem at a base station or the base station itself. The apparatus receives, from a UE, a request to establish a connection. The apparatus receives, from the UE, a PAPR report indicating one or more parameters to adjust the PAPR of each ADC of the UE. The apparatus transmits, to the UE, a downlink signal having an adjusted PAPR based on the one or more parameters provided by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
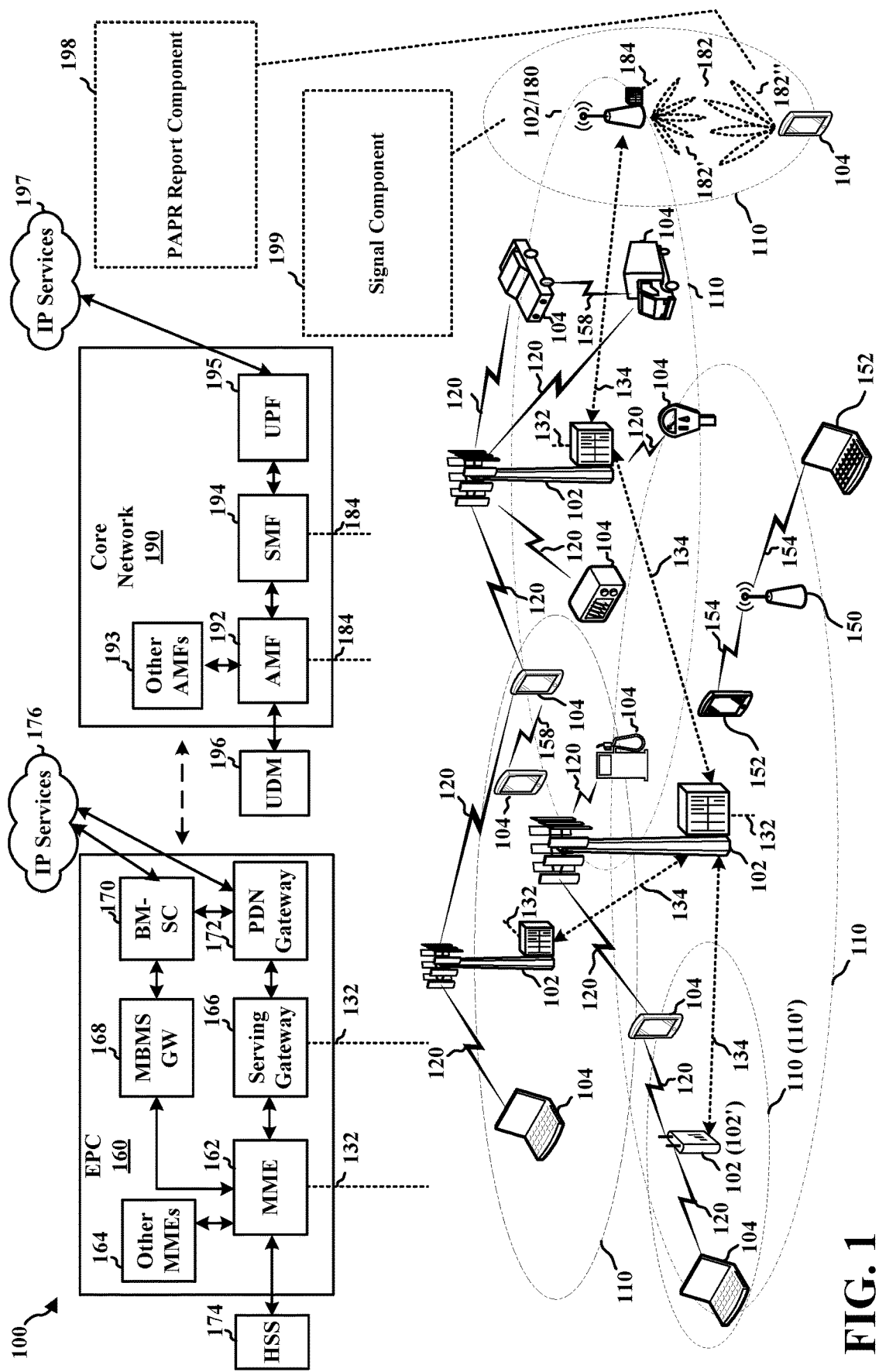
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to provide a PAPR report including parameters to adjust UE PAPR on each ADC at the UE 104. For example, the UE 104 of FIG. 1 may include a PAPR report component 198 configured to provide the PAPR report including the parameters to adjust the UE PAPR on each ADC at the UE 104. The UE 104 may establish a connection with a base station 180. The UE 104 may transmit, to the base station 180, a PAPR report indicating one or more parameters to adjust a PAPR of each ADC of the UE. The UE 104 may receive, from the base station 180, a downlink signal based on the PAPR report of the UE 104.

Referring again to FIG. 1, in certain aspects, the base station 180 may be configured to control the UE PAPR on each ADC at the UE 104 based on a PAPR report from the UE 104. For example, the base station 180 of FIG. 1 may include a signal component 199 configured to control the UE PAPR on each ADC at the UE 104 based on a PAPR report from the UE 104. The base station 180 may receive, from a UE 104, a request to establish a connection. The base station 180 may receive, from the UE 104, a PAPR report indicating one or more parameters to adjust a PAPR of each ADC of the UE 104. The base station 180 may transmit, to the UE 104, a downlink signal based on the PAPR report of the UE 104.

Although the following description may be focused on 5G NR, the concepts described herein may be applicable to other similar areas, such as LTE, LTE-A, CDMA, GSM, and other wireless technologies.

Figure 2:
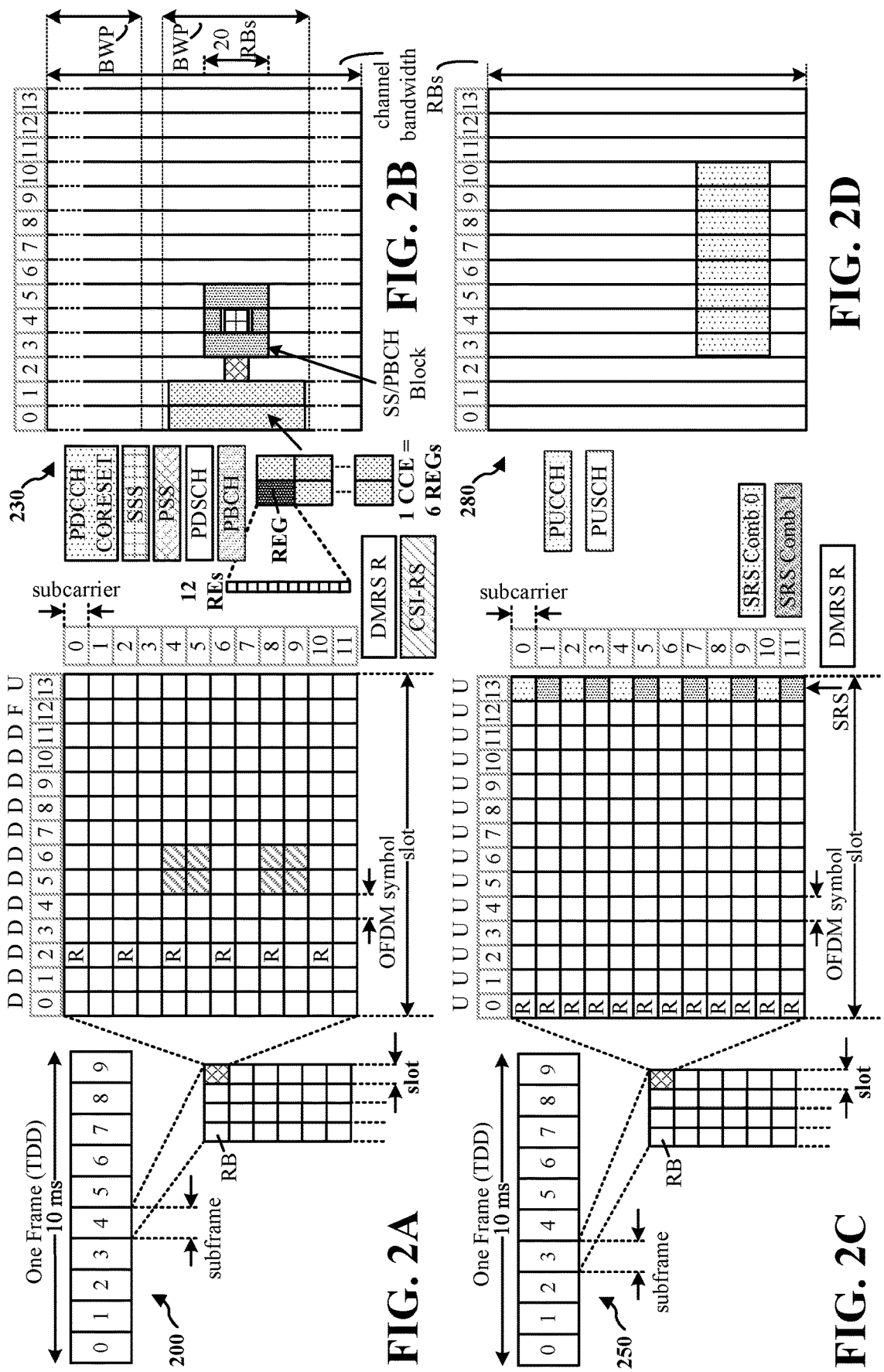
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
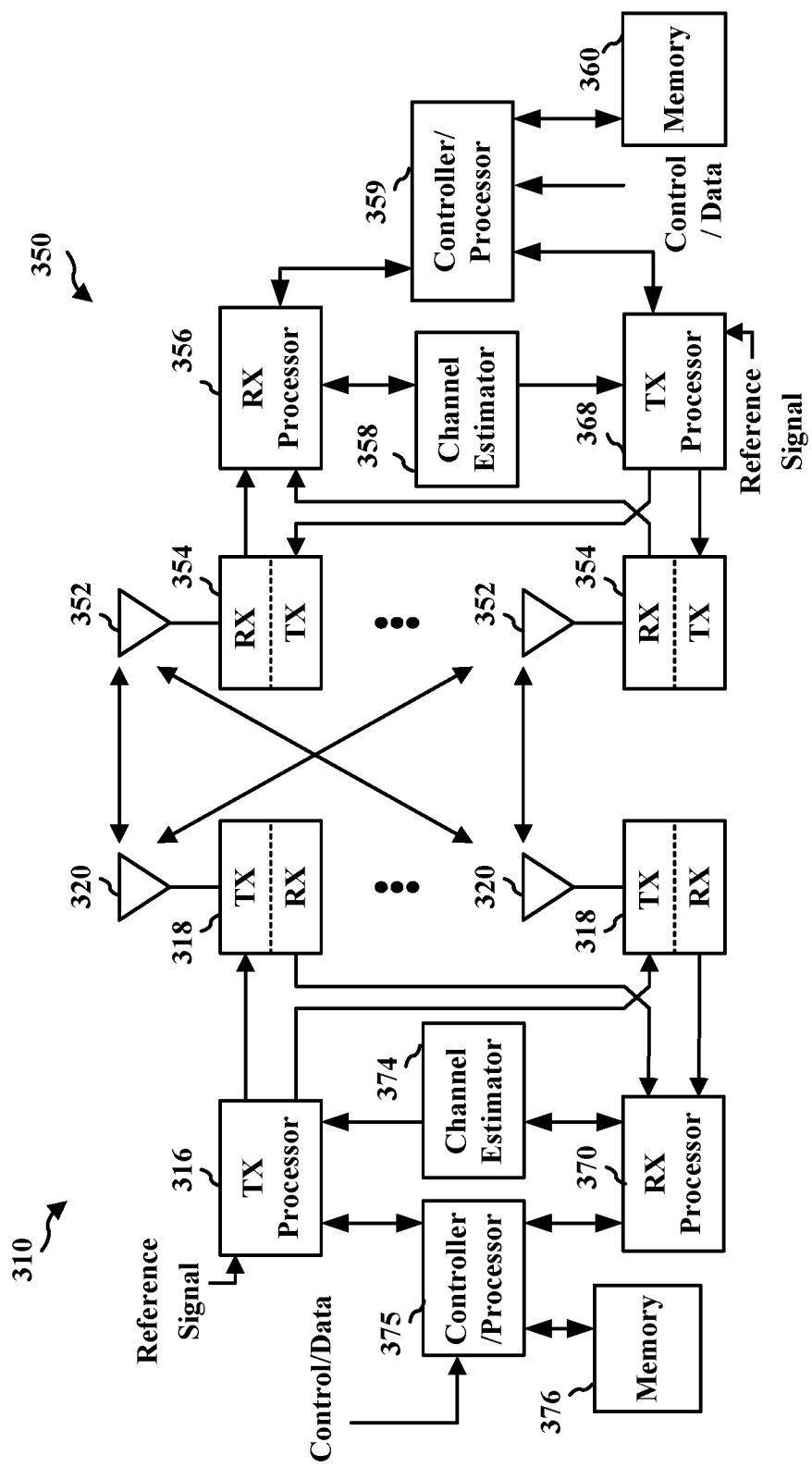
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems (e.g., including 5G NR wireless communication systems and other wireless communication systems), reducing the power consumption of the UE may be challenging. This challenge may become more prominent with the growth in bandwidths, such as expanding to bandwidths including frequency range (FR) 4, FR5, 6G, etc. Supporting higher bandwidth signals and increased data rates may result in an increase of power consumption at the UE.

As wireless communication systems progress to higher frequency bands, such as but not limited to sub-THz, the antenna dimensions may decrease due to the antenna size being relative to the wavelength. With the decreased size of individual antennas, a UE may include an increased number of antennas in the same size antenna array. An increase of the number of antenna elements may result in an improved spectral efficiency due to an increased array gain and a reduction of interference. For example, the increased number of antenna elements may enable the UE to transmit and receiving using a narrower beam width that may result in an increased spatial separation between beams.

Power consumption may include the power consumed by the antenna elements, but may also include processing of analog to digital converters (ADC), digital front end (DFE), and baseband processing. The usage of lower resolution ADCs may assist in reducing the power consumption by the ADCs, as well as by the DFEs due to the DFEs processing a baseband signal having a lower bit width. The number of bits utilized for operation of an ADC may be based on several factors, such as but not limited to PAPR, working signal to noise ratio (SNR), channel fading, automatic gain control (AGC) uncertainty.

Aspects presented herein provide a configuration for providing a PAPR report to a base station to optimize the UE power efficiency (e.g., power per bit) by controlling the received signal PAPR at the UE. In some aspects, the base station may receive a PAPR report from the UE indicating one or more parameters to adjust the PAPR of each ADC of the UE. The base station may transmit a downlink signal to the UE including PAPR reduction information indicating PAPR reduction methods utilized by the base station to adjust the PAPR on the ADCs of the UE. The exchange of information between the UE and the base station, e.g., about the adjustment or reduction of the PAPR, may enable the UE to use a lower resolution ADC processing, which may reduce power consumption at the UE. Thus, aspects presented herein enable a base station to apply adjustments to reduce PAPR for the UE based on information from the UE and to inform the UE of the reduction so that the UE can reduce ADC processing. The coordination of information between the base station and the UE may enable the UE to improve power savings. For example, the PAPR reduction information may assist in optimizing the UE AGC and the number of bits for the ADC. In some aspects, the UE may request a requested PAPR for a subsequent transmission from the base station, such that the base station may transmit to the UE updated PAPR reduction information that corresponds with the requested PAPR. At least one advantage of the disclosure is that providing PAPR reduction information may allow the UE to utilize low resolution ADCs, which may result in a reduction in UE power consumption. At least another advantage of the disclosure is that the process of the base station reducing the UE PAPR may be optimized based on the requested PAPR provided by the UE to the base station, such that the base station may efficiently reduce the UE PAPR.

In some instances, during a connection establishment procedure, the UE may report relevant parameters for UE PAPR reduction, such as but not limited to a number of antennas, a distance between adjacent antennas, an estimated signal angle of arrival, a UE antenna beam width, a PAPR requested variance on an antenna array, an averaged PAPR requested for a subsequent transmission from the base station, a maximum or minimum requested PAPR for each antenna element. The UE may provide the report of the relevant parameters in a semi-static manner, such as part of a capabilities exchange or a dedicated RRC message along with relevant parameters.

In some instances, the base station may provide, to the UE, PAPR reduction methods utilized by the base station. At least some of the reduction methods may include clipping and filtering, tone reservation, space frequency multi transmission reception point (SFMT), constellation extension, or the like. In some instances, the base station may report an estimated averaged PAPR and a corresponding variance on the antenna array, a maximum or minimum estimated PAPR and identify the corresponding antenna.

In some instances, the UE may identify and report (e.g., MAC-CE or RRC triggered message) ad-hoc an updated or requested PAPR. For example, the UE may identify a change in a UE PAPR. The change in the UE PAPR may comprise a change in a channel fading which may cause clipping and/or quantization in part of subcarriers. The UE may transmit, to the base station, a requested PAPR. The base station may update the signal PAPR in order to avoid or minimize clipping or quantization distortion at the UE.

In some instances, the base station may provide an update to the UE (e.g., via DCI, MAC-CE, or RRC) with an upcoming estimated averaged PAPR and a corresponding variance on the antenna array, a maximum or minimum estimated PAPR and indicate the corresponding antenna, as well as any other relevant parameters to control the PAPR at the UE. The UE may transmit a request for another requested PAPR, such that the base station may respond accordingly, as discussed herein. Such procedure may repeat as needed or may repeat in a periodic manner per CSI report.

Figure 4:
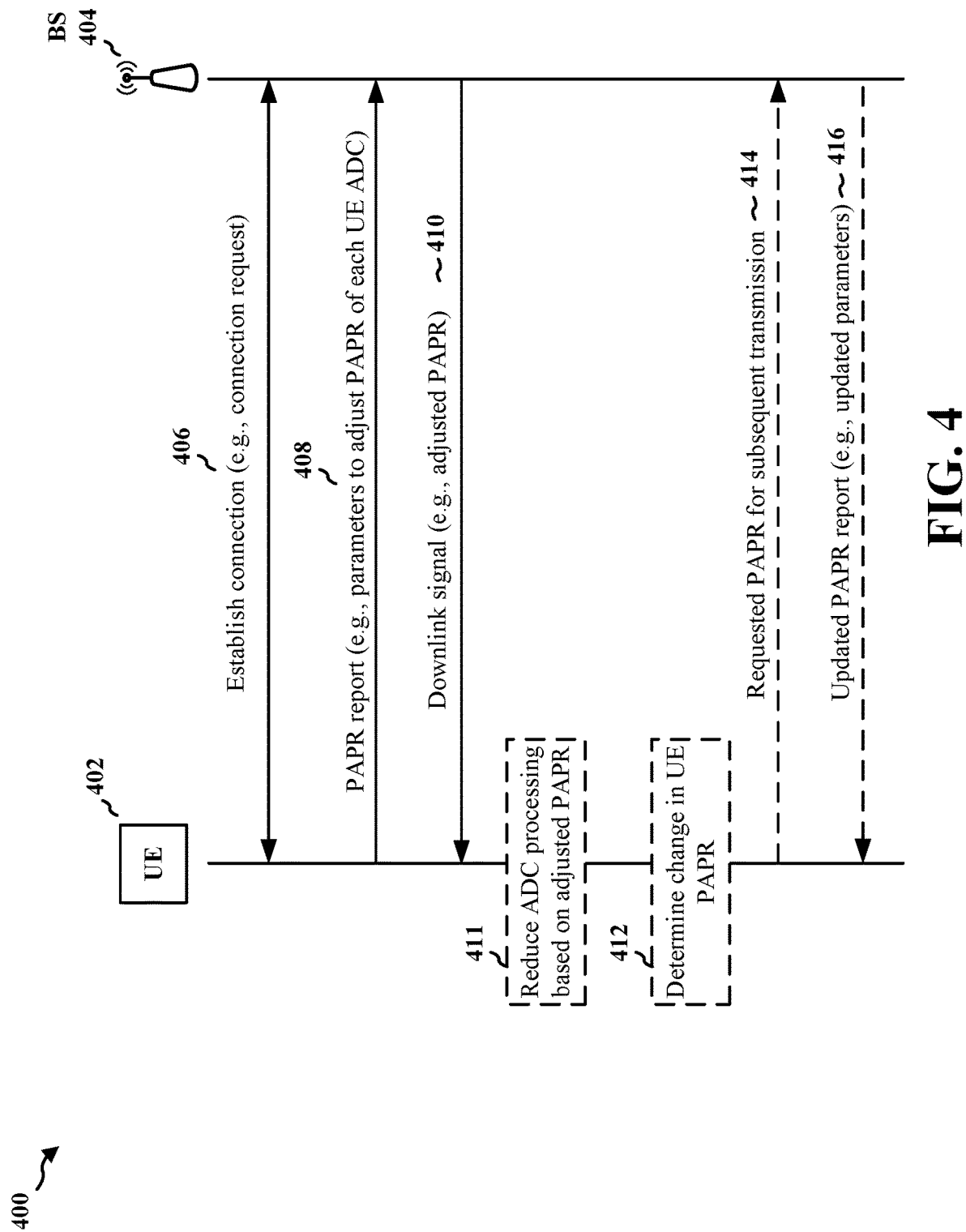
FIG. 4 is a call flow diagram of signaling between a UE and a base station in accordance with certain aspects of the disclosure.

FIG. 4 is a call flow diagram 400 of signaling between a UE 402 and a base station 404. The base station 404 may be configured to provide at least one cell. The UE 402 may be configured to communicate with the base station 404. For example, in the context of FIG. 1, the base station 404 may correspond to base station 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to base station 310 and the UE 402 may correspond to UE 350. Optional aspects are illustrated with a dashed line.

As illustrated at 406, the UE 402 may establish a connection with the base station 404. In some aspects, the UE 402 may transmit, to the base station 404, a request to establish a connection. The base station 404 may receive the request to establish the connection from the UE 402.

As illustrated at 408, the UE 402 may transmit a PAPR report indicating one or more parameters to adjust a PAPR of each ADC of the UE 402. The UE 402 may transmit the PAPR report to the base station 404. The base station 404 may receive the PAPR report from the UE 402. In some aspects, the one or more parameters to adjust the PAPR of the UE 402 may include at least one of a number of antennas at the UE 402, a distance between adjacent antennas, an angle of arrival for a signal from the base station 404, an antenna beam width of the UE 402, a requested PAPR variance on an antenna array of the UE 402, a requested averaged PAPR for a subsequent transmission from the base station 404, or a requested maximum or a minimum PAPR for each antenna element of the UE 402. The one or more parameters may adjust the PAPR on each ADC at the UE 402. In some aspects, the one or more parameters may adjust the PAPR on at least one ADC at the UE 402. In some aspects, the PAPR may be adjusted on each ADC at the UE 402 using the same or different one or more parameters. In some aspects, the PAPR may be adjusted on at least one ADC at the UE 402 using the same or different one or more parameters. In some aspects, the PAPR report may be transmitted in a semi-static manner as part of a capabilities exchange or a dedicated RRC message along with the one or more parameters to adjust the PAPR of the UE 402.

As illustrated at 410, the base station 404 may transmit a downlink signal having an adjusted PAPR based on the one or more parameters provided by the UE 402. The base station 404 may transmit the downlink signal to the UE 402. The UE 402 may receive the downlink signal from the base station 404. In some aspects, the transmitting the downlink signal to the UE 402 may comprise transmitting PAPR reduction information to the UE 402. In some aspects, the PAPR reduction information from the base station 404 may comprise an indication indicating PAPR reduction methods used by the base station 404. The PAPR reduction methods may comprise at least one of clipping, filtering, or tone reservation. In some aspects, the PAPR reduction information may comprise an estimated averaged PAPR and a corresponding variance on an antenna array. In some aspects, the PAPR reduction information may comprise a maximum or minimum estimated PAPR and an indication identifying a corresponding antenna of an antenna array.

In some aspects, for example as illustrated at 411, the UE 402 may reduce ADC processing at the UE. The UE 402 may reduce the ADC processing at the UE based on the adjusted PAPR of the downlink signal. ADC processing at the UE may be reduced due, in part, to the UE utilizing a low resolution ADC with the adjusted PAPR of the downlink signal. The number of bits that may be utilized with a low resolution ADC may be based on the PAPR, and the adjusted PAPR of the downlink signal may comprise a reduced number of bits, such that the UE may utilize a low resolution ADC. The UE utilizing the low resolution ADC may also reduce power consumption at the UE.

In some aspects, for example as illustrated at 412, the UE 402 may determine a change in the PAPR of the UE 402. In some aspects, the determining the change in the PAPR may comprise determining a change in a channel fading which may cause clipping or quantization in part of subcarriers.

In some aspects, for example as illustrated at 414, the UE 402 may transmit a requested PAPR for a subsequent transmission from the base station. The UE 402 may transmit, to the base station 404, the requested PAPR for the subsequent transmission from the base station 404. The base station 404 may receive the requested PAPR from the UE 402. The UE 402 may transmit the requested PAPR in response to the determination of the change in the PAPR of the UE 402. In some aspects, the requested PAPR may be transmitted via medium access control-control element (MAC-CE) or RRC.

In some aspects, for example as illustrated at 416, the base station 404 may transmit an updated PAPR report comprising updated parameters for the requested PAPR. The base station 404 may transmit the updated PAPR report comprising the updated parameters for the requested PAPR to the UE 402. The UE 402 may receive the updated PAPR report from the base station 404. In some aspects, the updated parameters may comprise at least one of an updated estimated averaged PAPR and an updated corresponding variance on an antenna array, or an updated maximum or minimum estimated PAPR and an indication identifying a corresponding antenna of the antenna array. In some aspects, the updated PAPR report may be transmitted via DCI, MAC-CE, or RRC.

Figure 5:
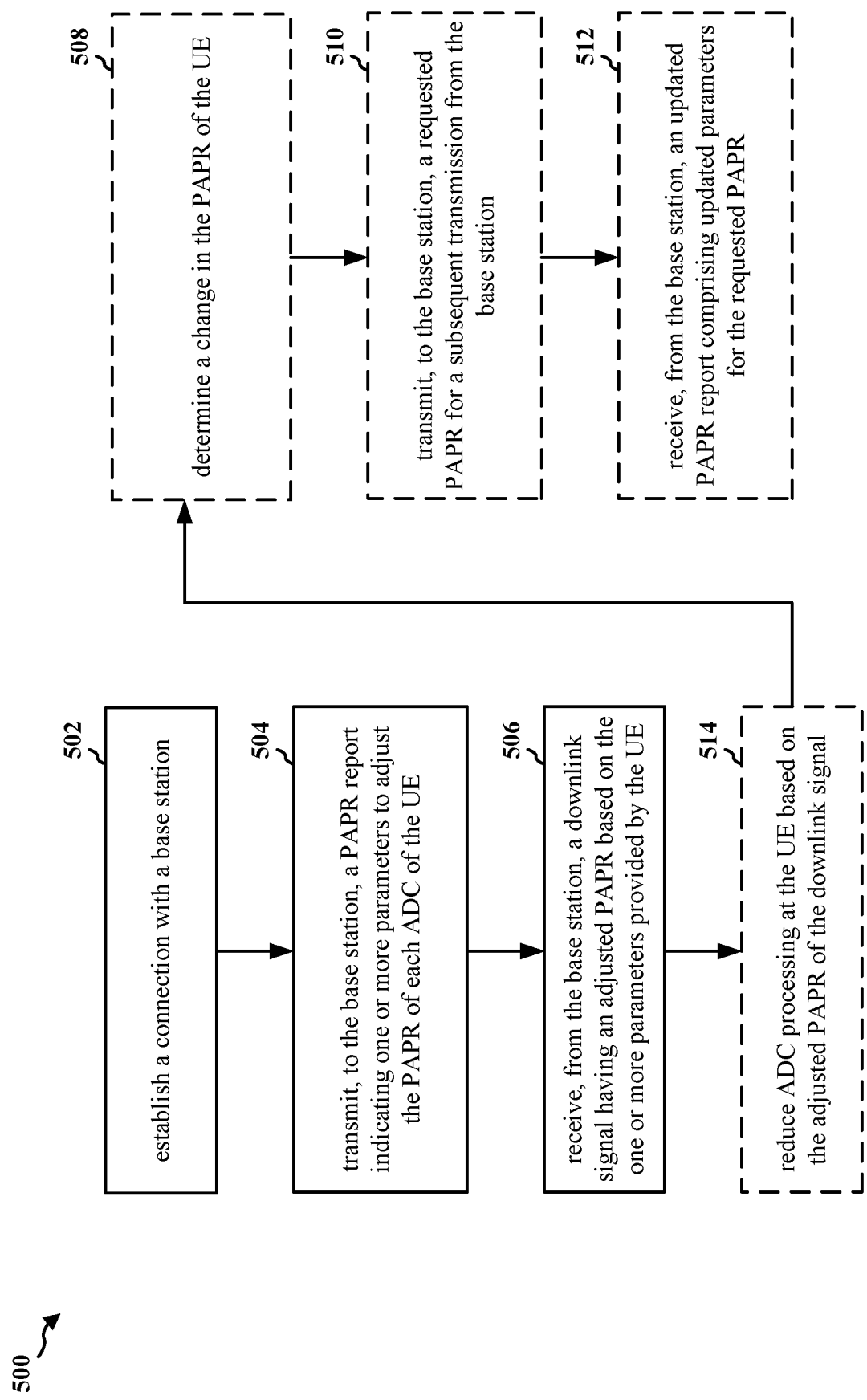
FIG. 5 is a flowchart of a method of wireless communication.

FIG. 5 is a flowchart 500 of a method of wireless communication. The method may be performed by a UE or a component of a UE (e.g., the UE 104; the apparatus 602; the cellular baseband processor 604, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to provide a PAPR report including parameters to adjust UE PAPR on each ADC at the UE.

At 502, the UE may establish a connection with a base station. For example, 502 may be performed by the connection component 640 of apparatus 602. In some aspects, the UE may transmit, to a base station, a request to establish a connection. For example, the UE may perform a random access procedure, or send a random access message, in order to establish a connection with the base station. FIG. 4 illustrates an example of the UE 402 establishing a connection 406 with the base station 404.

At 504, the UE may transmit a PAPR report indicating one or more parameters to adjust a PAPR of each ADC of the UE. For example, 504 may be performed by the PAPR report component 642 of apparatus 602. The UE may transmit the PAPR report to the base station. FIG. 4 illustrates an example of the UE 402 transmitting a PAPR report 408 to the base station 404. In some aspects, the one or more parameters to adjust the PAPR of the UE may include at least one of a number of antennas at the UE, a distance between adjacent antennas, an angle of arrival for a signal from the base station, an antenna beam width of the UE (e.g., averaged, maximum, or minimum beam width), a requested PAPR variance on an antenna array of the UE, a requested averaged PAPR for a subsequent transmission from the base station, or a requested maximum or a minimum PAPR for each antenna element of the UE. The one or more parameters may adjust the PAPR on each ADC at the UE. In some aspects, the one or more parameters may adjust the PAPR on at least one ADC at the UE. In some aspects, the PAPR may be adjusted on each ADC at the UE using the same or different one or more parameters. In some aspects, the PAPR may be adjusted on at least one ADC at the UE using the same or different one or more parameters. In some aspects, the PAPR report may be transmitted in a semi-static manner as part of a capabilities exchange or a dedicated RRC message along with the one or more parameters to adjust the PAPR of the UE.

At 506, the UE may receive a downlink signal having an adjusted PAPR based on the one or more parameters provided by the UE. For example, 506 may be performed by the signal component 644 of apparatus 602. The UE may receive the downlink signal from the base station. FIG. 4 illustrates an example of the UE 402 receiving a downlink signal 410 having the adjusted PAPR from the base station 404. In some aspects, the receiving the downlink signal from the base station may comprise receiving PAPR reduction information from the base station. The PAPR reduction information from the base station may comprise an indication indicating PAPR reduction methods used by the base station. The PAPR reduction methods may comprise at least one of clipping, filtering, or tone reservation. In some aspects, the PAPR reduction information may comprise an estimated averaged PAPR and a corresponding variance on an antenna array. In some aspects, the PAPR reduction information may comprise a maximum or minimum estimated PAPR and an indication identifying a corresponding antenna of an antenna array.

In some aspects, for example at 514, the UE may reduce ADC processing at the UE. For example, 514 may be performed by reduction component 650 of apparatus 602. FIG. 4 illustrates an example of the UE 402 reducing ADC processing 411 at the UE 402. The UE may reduce the ADC processing at the UE based on the adjusted PAPR of the downlink signal. ADC processing at the UE may be reduced due, in part, to the UE utilizing a low resolution ADC with the adjusted PAPR of the downlink signal. The number of bits that may be utilized with a low resolution ADC may be based on the PAPR, and the adjusted PAPR of the downlink signal may comprise a reduced number of bits, such that the UE may utilize a low resolution ADC. The UE utilizing the low resolution ADC may also reduce power consumption at the UE.

In some aspects, for example at 508, the UE may determine a change in the PAPR of the UE. For example, 508 may be performed by the determination component 646 of apparatus 602. FIG. 4 illustrates an example of the UE 402 determining a change in the PAPR of the UE, at 412. In some aspects, the determining the change in the PAPR may comprise determining a change in a channel fading which may cause clipping or quantization in part of subcarriers. In some aspects, the determining the change in the PAPR may comprise determining a change in working transmission or reception beams, measuring the PAPR from a previous slot to determine if the PAPR from the previous slot corresponds with a requested PAPR.

In some aspects, for example at 510, the UE may transmit a requested PAPR for a subsequent transmission from the base station. For example, 510 may be performed by the request component 648 of apparatus 602. The UE may transmit, to the base station, the requested PAPR for the subsequent transmission from the base station. FIG. 4 illustrates an example of the UE 402 transmitting a requested PAPR 414 to the base station 404. The UE may transmit the requested PAPR in response to the change in the PAPR of the UE. In some aspects, the requested PAPR may be transmitted via MAC-CE or RRC.

In some aspects, for example at 512, the UE may receive an updated PAPR report comprising updated parameters for the requested PAPR. For example, 512 may be performed by the PAPR report component 642 of apparatus 602. The UE may receive the updated PAPR report from the base station. FIG. 4 illustrates an example of the UE 402 receiving an updated PAPR report 416 from the base station 404. In some aspects, the updated parameters may comprise at least one of an updated estimated averaged PAPR and an updated corresponding variance on an antenna array, or an updated maximum or minimum estimated PAPR and an indication identifying a corresponding antenna of the antenna array. In some aspects, the updated PAPR report may be transmitted via DCI, MAC-CE, or RRC.

Figure 6:
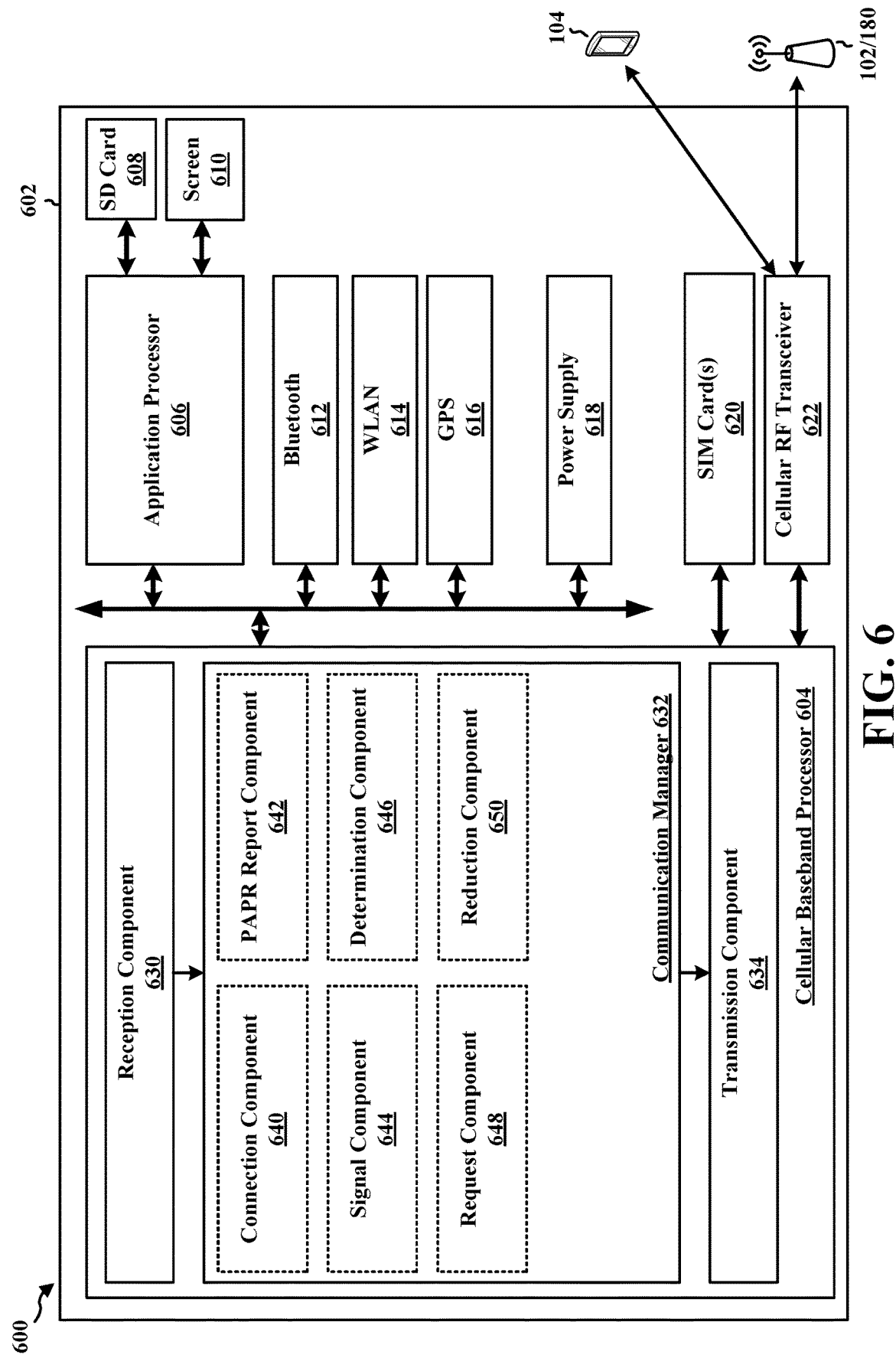
FIG. 6 is a diagram illustrating an example of a hardware implementation for an example apparatus.

FIG. 6 is a diagram 600 illustrating an example of a hardware implementation for an apparatus 602. The apparatus 602 is a UE and includes a cellular baseband processor 604 (also referred to as a modem) coupled to a cellular RF transceiver 622 and one or more subscriber identity modules (SIM) cards 620, an application processor 606 coupled to a secure digital (SD) card 608 and a screen 610, a Bluetooth module 612, a wireless local area network (WLAN) module 614, a Global Positioning System (GPS) module 616, and a power supply 618. The cellular baseband processor 604 communicates through the cellular RF transceiver 622 with the UE 104 and/or BS 102/180. The cellular baseband processor 604 may include a computer-readable medium/memory. The computer-readable medium/memory may be non-transitory. The cellular baseband processor 604 is responsible for general processing, including the execution of software stored on the computer-readable medium/memory. The software, when executed by the cellular baseband processor 604, causes the cellular baseband processor 604 to perform the various functions described supra. The computer-readable medium/memory may also be used for storing data that is manipulated by the cellular baseband processor 604 when executing software. The cellular baseband processor 604 further includes a reception component 630, a communication manager 632, and a transmission component 634. The communication manager 632 includes the one or more illustrated components. The components within the communication manager 632 may be stored in the computer-readable medium/memory and/or configured as hardware within the cellular baseband processor 604. The cellular baseband processor 604 may be a component of the UE 350 and may include the memory 360 and/or at least one of the TX processor 368, the RX processor 356, and the controller/processor 359. In one configuration, the apparatus 602 may be a modem chip and include just the cellular baseband processor 604, and in another configuration, the apparatus 602 may be the entire UE (e.g., see 350 of FIG. 3) and include the aforediscussed additional modules of the apparatus 602.

The communication manager 632 includes a connection component 640 that is configured to establish a connection with a base station, e.g., as described in connection with 502 of FIG. 5. The communication manager 632 further includes a PAPR report component 642 that is configured to transmit a PAPR report indicating one or more parameters to adjust a PAPR of each ADC of the UE, e.g., as described in connection with 504 of FIG. 5. The PAPR report component 642 may be configured to receive an updated PAPR report comprising updated parameters for a requested PAPR, e.g., as described in connection with 512 of FIG. 5. The communication manager 632 further includes a signal component 644 that is configured to receive a downlink signal having an adjusted PAPR based on the one or more parameters provided by the UE, e.g., as described in connection with 506 of FIG. 5. The communication manager 632 further includes a determination component 646 that is configured to determine a change in the PAPR of the UE, e.g., as described in connection 508 of FIG. 5. The communication manager 632 further includes a request component 648 that is configured to transmit a requested PAPR for a subsequent transmission from the base station, e.g., as described in connection with 510 of FIG. 5. The communication manager 632 further includes a reduction component 650 that is configured to reduce ADC processing at the UE based on the adjusted PAPR of the downlink signal, e.g., as described in connection with 514 of FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602, and in particular the cellular baseband processor 604, includes means for establishing a connection with a base station. The apparatus includes means for transmitting, to the base station, a PAPR report indicating one or more parameters to adjust a PAPR of each ADC of the UE. The apparatus includes means for receiving, from the base station, a downlink signal based on the PAPR report of the UE. The apparatus further includes means for determining a change in the PAPR of the UE. The apparatus further includes means for transmitting, to the base station, a requested PAPR for a subsequent transmission from the base station. The UE transmits the requested PAPR in response to the change in the PAPR of the UE. The apparatus further includes means for receiving, from the base station, an updated PAPR report comprising updated parameters for the requested PAPR. The apparatus further includes means for reducing ADC processing at the UE based on the adjusted PAPR of the downlink signal. The aforementioned means may be one or more of the aforementioned components of the apparatus 602 configured to perform the functions recited by the aforementioned means. As described supra, the apparatus 602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 7:
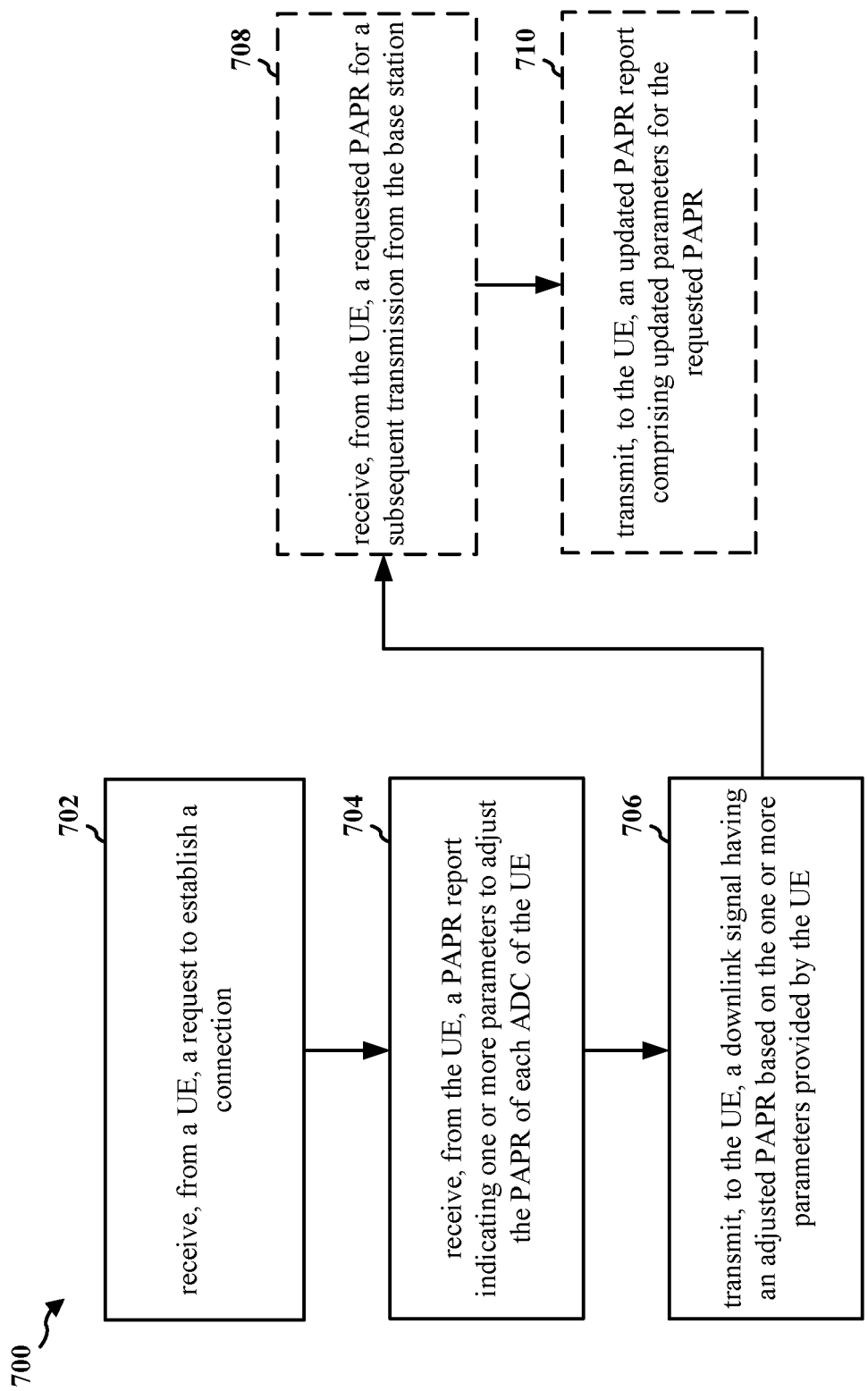
FIG. 7 is a flowchart of a method of wireless communication.

FIG. 7 is a flowchart 700 of a method of wireless communication. The method may be performed by a base station or a component of a base station (e.g., the base station 102/180; the apparatus 802; the baseband unit 804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to control the UE PAPR on each ADC at the UE based on a PAPR report from the UE.

At 702, the base station may receive a request to establish a connection. For example, 702 may be performed by the connection component 840 of apparatus 802. The base station may receive the request to establish the connection from a UE. For example, the UE may perform a random access procedure, or send a random access message, in order to establish a connection with the base station. FIG. 4 illustrates an example of the base station 404 establishing a connection 406 with the UE 402.

At 704, the base station may receive a PAPR report indicating one or more parameters to adjust a PAPR or each ADC of the UE. For example, 704 may be performed by the PAPR report component 842 of apparatus 802. The base station may receive the PAPR report from the UE. FIG. 4 illustrates an example of the base station 404 receiving a PAPR report 408 from the UE 402. In some aspects, the one or more parameters to adjust the PAPR of the UE may include at least one of a number of antennas at the UE, a distance between adjacent antennas, an angle of arrival for a signal from the base station, an antenna beam width of the UE, a requested PAPR variance on an antenna array of the UE, a requested averaged PAPR for a subsequent transmission from the base station, or a requested maximum or a minimum PAPR for each antenna element of the UE. The one or more parameters may adjust the PAPR on each ADC at the UE. In some aspects, the one or more parameters may adjust the PAPR on at least one ADC at the UE. In some aspects, the PAPR may be adjusted on each ADC at the UE using the same or different one or more parameters. In some aspects, the PAPR may be adjusted on at least one ADC at the UE using the same or different one or more parameters. In some aspects, the PAPR report may be received in a semi-static manner as part of a capabilities exchange or a dedicated RRC message along with the one or more parameters to adjust the PAPR of the UE.

At 706, the base station may transmit a downlink signal having an adjusted PAPR based on the one or more parameters provided by the UE. For example, 706 may be performed by the signal component 844 of apparatus 802. The base station may transmit the downlink signal to the UE. FIG. 4 illustrates an example of the base station 404 transmitting a downlink signal 410 to the UE 402. In some aspects, the transmitting the downlink signal to the UE may comprise transmitting PAPR reduction information to the UE. In some aspects, the PAPR reduction information from the base station may comprise an indication indicating PAPR reduction methods used by the base station. The PAPR reduction methods may comprise at least one of clipping, filtering, or tone reservation. In some aspects, the PAPR reduction information may comprise an estimated averaged PAPR and a corresponding variance on an antenna array. In some aspects, the PAPR reduction information may comprise a maximum or minimum estimated PAPR and an indication identifying a corresponding antenna of an antenna array.

In some aspects, for example at 708, the base station may receive a requested PAPR for a subsequent transmission from the base station. For example, 708 may be performed by the request component 846 of apparatus 802. The base station may receive the requested PAPR from the UE. FIG. 4 illustrates an example of base station 404 receiving a requested PAPR 414 from the UE 402. The base station may receive the requested PAPR in response to a change in the PAPR of the UE. In some aspects, the requested PAPR may be transmitted via MAC-CE or RRC.

In some aspects, for example at 710, the base station may transmit an updated PAPR report comprising updated parameters for the requested PAPR. For example, 710 may be performed by the PAPR report component 842 of apparatus 802. The base station may transmit the updated PAPR report comprising the updated parameters for the requested PAPR to the UE. FIG. 4 illustrates an example of the base station transmitting an updated PAPR report 416 to the UE 402. In some aspects, the updated parameters may comprise at least one of an updated estimated averaged PAPR and an updated corresponding variance on an antenna array, or an updated maximum or minimum estimated PAPR and an indication identifying a corresponding antenna of the antenna array. In some aspects, the updated PAPR report may be transmitted via DCI, MAC-CE, or RRC.

Figure 8:
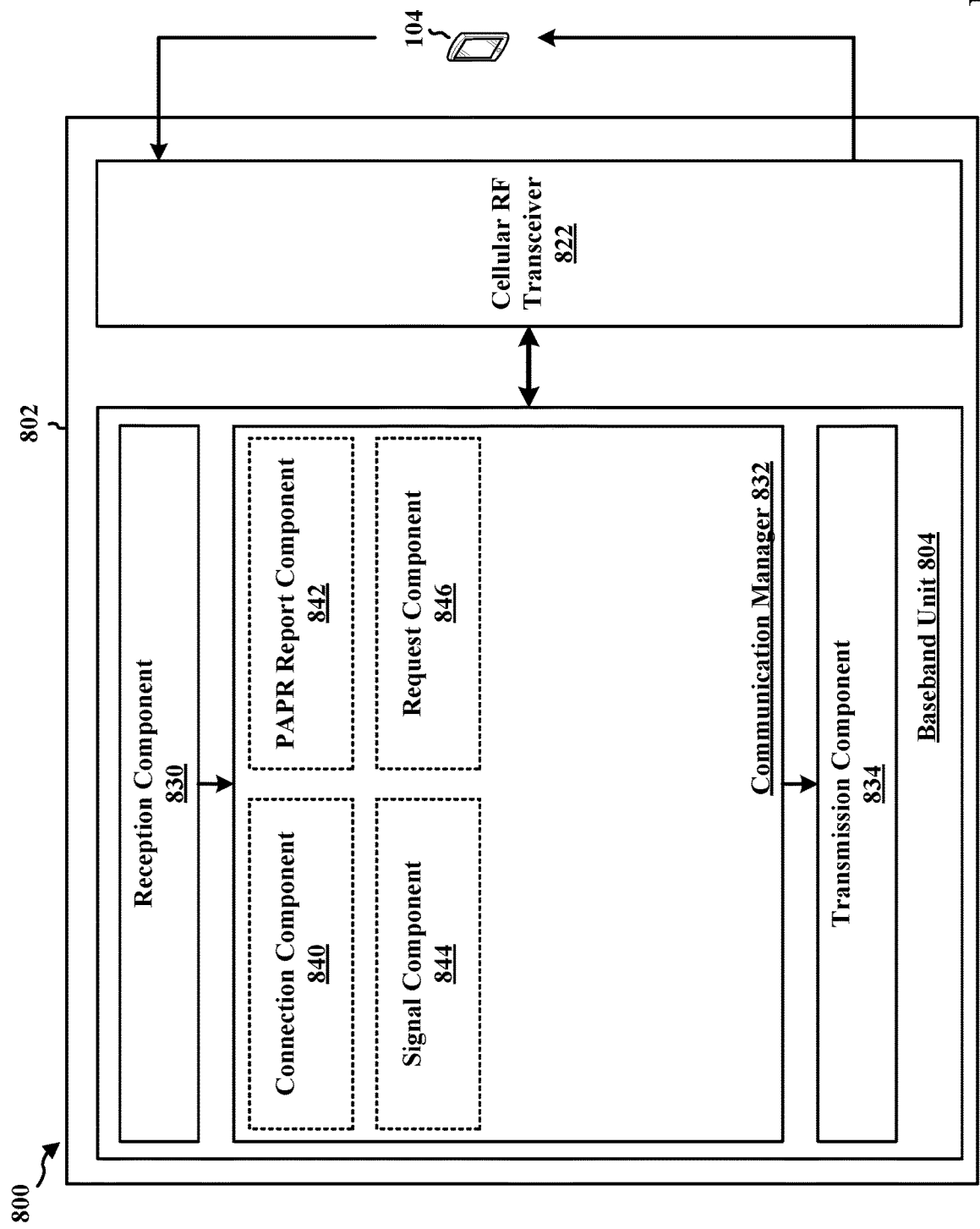
FIG. 8 is a diagram illustrating an example of a hardware implementation for an example apparatus.

FIG. 8 is a diagram 800 illustrating an example of a hardware implementation for an apparatus 802. The apparatus 802 is a BS and includes a baseband unit 804. The baseband unit 804 may communicate through a cellular RF transceiver 822 with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 includes a connection component 840 that may receive a request to establish a connection, e.g., as described in connection with 702 of FIG. 7. The communication manager 832 further includes a PAPR report component 842 that may receive a PAPR report indicating one or more parameters to adjust a PAPR or each ADC of the UE, e.g., as described in connection with 704 of FIG. 7. The PAPR report component 842 may be configured to transmit an updated PAPR report comprising updated parameters for the requested PAPR, e.g., as described in connection with 710 of FIG. 7. The communication manager 832 further includes a signal component 844 that may transmit a downlink signal having an adjusted PAPR based on the one or more parameters provided by the UE, e.g., as described in connection with 706 of FIG. 7. the communication manager 832 further includes a request component 846 that may receive a requested PAPR for a subsequent transmission from the base station, e.g., as described in connection with 708 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for receiving, from a UE, a request to establish a connection. The apparatus includes means for receiving, from the UE, a PAPR report indicating one or more parameters to adjust a PAPR of each ADC of the UE. The apparatus includes means for transmitting, to the UE, a downlink signal based on the PAPR report of the UE. The apparatus further includes means for receiving, from the UE, a requested PAPR for a subsequent transmission from the base station, wherein the base station receives the requested PAPR in response to a change in the PAPR of the UE. The apparatus further includes means for transmitting, to the UE, an updated PAPR report comprising updated parameters for the requested PAPR. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE comprising establishing a connection with a base station;

transmitting, to the base station, a PAPR report indicating one or more parameters to adjust a PAPR of each ADC of the UE; and receiving, from the base station, a downlink signal having an adjusted PAPR based on the one or more parameters provided by the UE.

In Aspect 2, the method of Aspect 1 further includes that the one or more parameters to adjust the PAPR of the UE include at least one of a number of antennas at the UE, a distance between adjacent antennas, an angle of arrival for a signal from the base station, an antenna beam width of the UE, a requested PAPR variance on an antenna array of the UE, a requested averaged PAPR for a subsequent transmission from the base station, or a requested maximum or a minimum PAPR for each antenna element of the UE.

In Aspect 3, the method of Aspect 1 or 2 further includes that the PAPR report is transmitted in a semi-static manner as part of a capabilities exchange or a dedicated RRC message along with the one or more parameters to adjust the PAPR of the UE.

In Aspect 4, the method of any of Aspects 1-3 further includes that the receiving the downlink signal from the base station comprises receiving PAPR reduction information from the base station.

In Aspect 5, the method of any of Aspects 1-4 further includes that the PAPR reduction information from the base station comprises an indication indicating PAPR reduction methods used by the base station, wherein the PAPR reduction methods comprise at least one of clipping, filtering, or tone reservation.

In Aspect 6, the method of any of Aspects 1-5 further includes that the PAPR reduction information comprises an estimated averaged PAPR and a corresponding variance on an antenna array.

In Aspect 7, the method of any of Aspects 1-6 further includes that the PAPR reduction information comprises a maximum or minimum estimated PAPR and an indication identifying a corresponding antenna of an antenna array.

In Aspect 8, the method of any of Aspects 1-7 further includes determining a change in the PAPR of the UE; and transmitting, to the base station, a requested PAPR for a subsequent transmission from the base station, wherein the UE transmits the requested PAPR in response to the change in the PAPR of the UE.

In Aspect 9, the method of any of Aspects 1-8 further includes that the determining the change in the PAPR comprises determining a change in a channel fading causing clipping or quantization in part of subcarriers.

In Aspect 10, the method of any of Aspects 1-9 further includes that the requested PAPR is transmitted via MAC-CE or RRC.

In Aspect 11, the method of any of Aspects 1-10 further includes receiving, from the base station, an updated PAPR report comprising updated parameters for the requested PAPR.

In Aspect 12, the method of any of Aspects 1-11 further includes that the updated parameters comprise at least one of an updated estimated averaged PAPR and an updated corresponding variance on an antenna array, or an updated maximum or minimum estimated PAPR and an indication identifying a corresponding antenna of the antenna array.

In Aspect 13, the method of any of Aspects 1-12 further includes that the updated PAPR report is transmitted via DCI, MAC-CE, or RRC.

In Aspect 14, the method of any of Aspects 1-13 further includes reducing ADC processing at the UE based on the adjusted PAPR of the downlink signal.

Aspect 15 is a device including one or more processors and one or more memories in electronic communication with the one or more processors storing instructions executable by the one or more processors to cause the system or apparatus to implement a method as in any of Aspects 1-14.

Aspect 16 is a system or apparatus including means for implementing a method or realizing an apparatus as in any of Aspects 1-14.

Aspect 17 is a non-transitory computer readable medium storing instructions executable by one or more processors to cause the one or more processors to implement a method as in any of Aspects 1-14.

Aspect 18 is a method of wireless communication at a base station comprising receiving, from a UE, a request to establish a connection; receiving, from the UE, a PAPR report indicating one or more parameters to adjust a PAPR of each ADC of the UE; and transmitting, to the UE, a downlink signal having an adjusted PAPR based on the one or more parameters provided by the UE.

In Aspect 19, the method of Aspect 18 further includes that the one or more parameters to adjust the PAPR of the UE include at least one of a number of antennas at the UE, a distance between adjacent antennas, an angle of arrival for a signal from the base station, an antenna beam width of the UE, a requested PAPR variance on an antenna array of the UE, a requested averaged PAPR for a subsequent transmission from the base station, or a requested maximum or a minimum PAPR for each antenna element of the UE.

In Aspect 20, the method of Aspect 18 or 19 further includes that the PAPR report is received in a semi-static manner as part of a capabilities exchange or a dedicated RRC message along with the one or more parameters to adjust the PAPR of the UE.

In Aspect 21, the method of any of Aspects 18-20 further includes that the transmitting the downlink signal to the UE comprises transmitting PAPR reduction information to the UE.

In Aspect 22, the method of any of Aspects 18-21 further includes that the PAPR reduction information from the base station comprises an indication indicating PAPR reduction methods used by the base station, wherein the PAPR reduction methods comprise at least one of clipping, filtering, or tone reservation.

In Aspect 23, the method of any of Aspects 18-22 further includes that the PAPR reduction information comprises an estimated averaged PAPR and a corresponding variance on an antenna array.

In Aspect 24, the method of any of Aspects 18-23 further includes that the PAPR reduction information comprises a maximum or minimum estimated PAPR and an indication identifying a corresponding antenna of an antenna array.

In Aspect 25, the method of any of Aspects 18-24 further includes receiving, from the UE, a requested PAPR for a subsequent transmission from the base station, wherein the base station receives the requested PAPR in response to a change in the PAPR of the UE.

In Aspect 26, the method of any of Aspects 18-25 further includes that the requested PAPR is transmitted via MAC-CE or RRC.

In Aspect 27, the method of any of Aspects 18-26 further includes transmitting, to the UE, an updated PAPR report comprising updated parameters for the requested PAPR.

In Aspect 28, the method of any of Aspects 18-27 further includes that the updated parameters comprise at least one of an updated estimated averaged PAPR and an updated corresponding variance on an antenna array, or an updated maximum or minimum estimated PAPR and an indication identifying a corresponding antenna of the antenna array.

In Aspect 29, the method of any of Aspects 18-28 further includes that the updated PAPR report is transmitted via DCI, MAC-CE, or RRC.

Aspect 30 is a device including one or more processors and one or more memories in electronic communication with the one or more processors storing instructions executable by the one or more processors to cause the system or apparatus to implement a method as in any of Aspects 18-29.

Aspect 31 is a system or apparatus including means for implementing a method or realizing an apparatus as in any of Aspects 18-29.

Aspect 32 is a non-transitory computer readable medium storing instructions executable by one or more processors to cause the one or more processors to implement a method as in any of Aspects 18-29.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

establishing a connection with a base station;

transmitting, to the base station, a peak to average power ratio (PAPR) report indicating one or more parameters to adjust a PAPR of each analog to digital converter (ADC) of the UE; and receiving, from the base station, a downlink signal having an adjusted PAPR based on the one or more parameters provided by the UE and PAPR reduction information from the base station.

2. A method of wireless communication at a user equipment (UE), comprising:

establishing a connection with a base station;

transmitting, to the base station, a peak to average power ratio (PAPR) report indicating one or more parameters to adjust a PAPR of each analog to digital converter (ADC) of the UE; and receiving, from the base station, a downlink signal having an adjusted PAPR based on the one or more parameters provided by the UE, wherein the one or more parameters to adjust the PAPR of the UE include at least one of:

a number of antennas at the UE, a distance between adjacent antennas, an angle of arrival for a signal from the base station, an antenna beam width of the UE, a requested PAPR variance on an antenna array of the UE, a requested averaged PAPR for a subsequent transmission from the base station, or a requested maximum or a minimum PAPR for each antenna element of the UE.

3. The method of claim 1, wherein the PAPR report is transmitted in a semi-static manner as part of a capabilities exchange or a dedicated radio resource control (RRC) message along with the one or more parameters to adjust the PAPR of the UE.

4. The method of claim 1, wherein the PAPR reduction information from the base station comprises an indication indicating PAPR reduction methods used by the base station, wherein the PAPR reduction methods comprise at least one of clipping, filtering, or tone reservation.

5. The method of claim 1, wherein the PAPR reduction information comprises an estimated averaged PAPR and a corresponding variance on an antenna array.

6. The method of claim 1, wherein the PAPR reduction information comprises a maximum or minimum estimated PAPR and an indication identifying a corresponding antenna of an antenna array.

7. A method of wireless communication at a user equipment (UE), comprising:

establishing a connection with a base station;

transmitting, to the base station, a peak to average power ratio (PAPR) report indicating one or more parameters to adjust a PAPR of each analog to digital converter (ADC) of the UE;

receiving, from the base station, a downlink signal having an adjusted PAPR based on the one or more parameters provided by the UE;

determining a change in the PAPR of the UE; and transmitting, to the base station, a requested PAPR for a subsequent transmission from the base station, wherein the UE transmits the requested PAPR in response to the change in the PAPR of the UE.

8. The method of claim 7, wherein the determining the change in the PAPR comprises determining a change in a channel fading causing clipping or quantization in part of subcarriers.

9. The method of claim 7, wherein the requested PAPR is transmitted via medium access control-control element (MAC-CE) or radio resource control (RRC).

10. The method of claim 7, further comprising:
receiving, from the base station, an updated PAPR report comprising updated parameters for the requested PAPR.

11. The method of claim 10, wherein the updated parameters comprise at least one of:
an updated estimated averaged PAPR and an updated corresponding variance on an antenna array, or
an updated maximum or minimum estimated PAPR and an indication identifying a corresponding antenna of the antenna array.

12. The method of claim 10, wherein the updated PAPR report is transmitted via downlink control information (DCI), medium access control-control element (MAC-CE), or radio resource control (RRC).

13. The method of claim 1, further comprising:
reducing ADC processing at the UE based on the adjusted PAPR of the downlink signal.

14. An apparatus for wireless communication at a user equipment (UE), comprising:
a memory; and
at least one processor coupled to the memory and configured to:
establish a connection with a base station;
transmit, to the base station, a peak to average power ratio (PAPR) report indicating one or more parameters to adjust a PAPR of each analog to digital converter (ADC) of the UE; and
receive, from the base station, a downlink signal having an adjusted PAPR based on the one or more parameters provided by the UE and PAPR reduction information from the base station.

15. The apparatus of claim 14, wherein the PAPR report is transmitted in a semi-static manner as part of a capabilities exchange or a dedicated radio resource control (RRC) message along with the one or more parameters to adjust the PAPR of the UE.

16. The apparatus of claim 14, wherein the PAPR reduction information from the base station comprises an indication indicating PAPR reduction methods used by the base station, wherein the PAPR reduction methods comprise at least one of clipping, filtering, or tone reservation.

17. The apparatus of claim 14, wherein the PAPR reduction information comprises an estimated averaged PAPR and a corresponding variance on an antenna array.

18. The apparatus of claim 14, wherein the PAPR reduction information comprises a maximum or minimum estimated PAPR and an indication identifying a corresponding antenna of an antenna array.

19. An apparatus for wireless communication at a user equipment (UE), comprising:
a memory; and
at least one processor coupled to the memory and configured to:
establish a connection with a base station;
transmit, to the base station, a peak to average power ratio (PAPR) report indicating one or more parameters to adjust a PAPR of each analog to digital converter (ADC) of the UE;
receive, from the base station, a downlink signal having an adjusted PAPR based on the one or more parameters provided by the UE;
determine a change in the PAPR of the UE; and
transmit, to the base station, a requested PAPR for a subsequent transmission from the base station, wherein the UE transmits the requested PAPR in response to the change in the PAPR of the UE.

20. The apparatus of claim 19, wherein to determine the change in the PAPR, the at least one processor is configured to determine a change in a channel fading causing clipping or quantization in part of subcarriers.

21. The apparatus of claim 19, wherein the requested PAPR is transmitted via medium access control-control element (MAC-CE) or radio resource control (RRC).

22. The apparatus of claim 19, wherein to determine the change in the PAPR, the at least one processor is configured to:
receive, from the base station, an updated PAPR report comprising updated parameters for the requested PAPR.

23. The apparatus of claim 22, wherein the updated parameters comprise at least one of:
an updated estimated averaged PAPR and an updated corresponding variance on an antenna array, or
an updated maximum or minimum estimated PAPR and an indication identifying a corresponding antenna of the antenna array.

24. The apparatus of claim 22, wherein the updated PAPR report is transmitted via downlink control information (DCI), medium access control-control element (MAC-CE), or radio resource control (RRC).

25. A method of wireless communication at a base station comprising:
receiving, from a user equipment (UE), a request to establish a connection;
receiving, from the UE, a peak to average power ratio (PAPR) report indicating one or more parameters to adjust a PAPR of each analog to digital converter (ADC) of the UE; and
transmitting, to the UE, a downlink signal having an adjusted PAPR based on the one or more parameters provided by the UE and PAPR reduction information from the base station.

26. The method of claim 25, wherein the PAPR report is received in a semi-static manner as part of a capabilities exchange or a dedicated radio resource control (RRC) message along with the one or more parameters to adjust the PAPR of the UE.

27. The method of claim 25, wherein the PAPR reduction information from the base station comprises an indication indicating PAPR reduction methods used by the base station, wherein the PAPR reduction methods comprise at least one of clipping, filtering, or tone reservation.

28. The method of claim 25, wherein the PAPR reduction information comprises an estimated averaged PAPR and a corresponding variance on an antenna array.

29. The method of claim 25, wherein the PAPR reduction information comprises a maximum or minimum estimated PAPR and an indication identifying a corresponding antenna of an antenna array.

30. A method of wireless communication at a base station comprising:
receiving, from a user equipment (UE), a request to establish a connection;
receiving, from the UE, a peak to average power ratio (PAPR) report indicating one or more parameters to adjust a PAPR of each analog to digital converter (ADC) of the UE; and
transmitting, to the UE, a downlink signal having an adjusted PAPR based on the one or more parameters provided by the UE, wherein the one or more parameters to adjust the PAPR of the UE include at least one of:
a number of antennas at the UE,
a distance between adjacent antennas,
an angle of arrival for a signal from the base station,
an antenna beam width of the UE,
a requested PAPR variance on an antenna array of the UE,
a requested averaged PAPR for a subsequent transmission from the base station, or
a requested maximum or a minimum PAPR for each antenna element of the UE.

31. A method of wireless communication at a base station comprising:
receiving, from a user equipment (UE), a request to establish a connection;
receiving, from the UE, a peak to average power ratio (PAPR) report indicating one or more parameters to adjust a PAPR of each analog to digital converter (ADC) of the UE;
transmitting, to the UE, a downlink signal having an adjusted PAPR based on the one or more parameters provided by the UE; and
receiving, from the UE, a requested PAPR for a subsequent transmission from the base station, wherein the base station receives the requested PAPR in response to a change in the PAPR of the UE.

32. The method of claim 31, wherein the requested PAPR is transmitted via medium access control-control element (MAC-CE) or radio resource control (RRC).

33. The method of claim 31, further comprising:
transmitting, to the UE, an updated PAPR report comprising updated parameters for the requested PAPR.

34. The method of claim 33, wherein the updated parameters comprise at least one of an updated estimated averaged PAPR and an updated corresponding variance on an antenna array, or an updated maximum or minimum estimated PAPR and an indication identifying a corresponding antenna of the antenna array.

35. The method of claim 33, wherein the updated PAPR report is transmitted via downlink control information (DCI), medium access control-control element (MAC-CE), or radio resource control (RRC).

36. An apparatus for wireless communication at a base station, comprising:
a memory; and
at least one processor coupled to the memory and configured to:
receive, from a user equipment (UE), a request to establish a connection;
receive, from the UE, a peak to average power ratio (PAPR) report indicating one or more parameters to adjust a PAPR of each analog to digital converter (ADC) of the UE; and
transmit, to the UE, a downlink signal having an adjusted PAPR based on the one or more parameters provided by the UE and PAPR reduction information from the base station.

37. The apparatus of claim 36, wherein the PAPR report is received in a semi-static manner as part of a capabilities exchange or a dedicated radio resource control (RRC) message along with the one or more parameters to adjust the PAPR of the UE.

38. The apparatus of claim 36, wherein the PAPR reduction information from the base station comprises an indication indicating PAPR reduction methods used by the base station, wherein the PAPR reduction methods comprise at least one of clipping, filtering, or tone reservation.

39. The apparatus of claim 36, wherein the PAPR reduction information comprises an estimated averaged PAPR and a corresponding variance on an antenna array.

40. The apparatus of claim 36, wherein the PAPR reduction information comprises a maximum or minimum estimated PAPR and an indication identifying a corresponding antenna of an antenna array.

41. An apparatus for wireless communication at a base station, comprising:
a memory; and
at least one processor coupled to the memory and configured to:
receive, from a user equipment (UE), a request to establish a connection;
receive, from the UE, a peak to average power ratio (PAPR) report indicating one or more parameters to adjust a PAPR of each analog to digital converter (ADC) of the UE;
transmit, to the UE, a downlink signal having an adjusted PAPR based on the one or more parameters provided by the UE; and
receive, from the UE, a requested PAPR for a subsequent transmission from the base station, wherein the base station receives the requested PAPR in response to a change in the PAPR of the UE.

42. The apparatus of claim 41, wherein the requested PAPR is transmitted via medium access control-control element (MAC-CE) or radio resource control (RRC).

43. The apparatus of claim 41, wherein the at least one processor is further configured to:
transmit, to the UE, an updated PAPR report comprising updated parameters for the requested PAPR.

44. The apparatus of claim 43, wherein the updated parameters comprises at least one of an updated estimated averaged PAPR and an updated corresponding variance on an antenna array, or an updated maximum or minimum estimated PAPR and an indication identifying a corresponding antenna of the antenna array.

45. The apparatus of claim 43, wherein the updated PAPR report is transmitted via downlink control information (DCI), medium access control-control element (MAC-CE), or radio resource control (RRC).

46. An apparatus for wireless communication at a user equipment (UE), comprising:
means for establishing a connection with a base station;
means for transmitting, to the base station, a peak to average power ratio (PAPR) report indicating one or more parameters to adjust a PAPR of each analog to digital converter (ADC) of the UE; and
means for receiving, from the base station, a downlink signal having an adjusted PAPR based on the one or more parameters provided by the UE and PAPR reduction information from the base station.

47. An apparatus for wireless communication at a user equipment (UE), comprising:
means for establishing a connection with a base station;
means for transmitting, to the base station, a peak to average power ratio (PAPR) report indicating one or more parameters to adjust a PAPR of each analog to digital converter (ADC) of the UE; and
means for receiving, from the base station, a downlink signal having an adjusted PAPR based on the one or more parameters provided by the UE, wherein the one or more parameters to adjust the PAPR of the UE include at least one of:

a number of antennas at the UE,
a distance between adjacent antennas,
an angle of arrival for a signal from the base station,
an antenna beam width of the UE,
a requested PAPR variance on an antenna array of the UE,
a requested averaged PAPR for a subsequent transmission from the base station, or
a requested maximum or a minimum PAPR for each antenna element of the UE.

48. An apparatus for wireless communication at a user equipment (UE), comprising:
    means for establishing a connection with a base station;
    means for transmitting, to the base station, a peak to average power ratio (PAPR) report indicating one or more parameters to adjust a PAPR of each analog to digital converter (ADC) of the UE;
    means for receiving, from the base station, a downlink signal having an adjusted PAPR based on the one or more parameters provided by the UE;
    means for determining a change in the PAPR of the UE; and
    means for transmitting, to the base station, a requested PAPR for a subsequent transmission from the base station, wherein the UE transmits the requested PAPR in response to the change in the PAPR of the UE.

49. A non-transitory computer-readable medium storing computer executable code at a user equipment (UE), the code when executed by a processor causes the processor to:
    establish a connection with a base station;
    transmit, to the base station, a peak to average power ratio (PAPR) report indicating one or more parameters to adjust a PAPR of each analog to digital converter (ADC) of the UE; and
    receive, from the base station, a downlink signal having an adjusted PAPR based on the one or more parameters provided by the UE and PAPR reduction information from the base station.

50. A non-transitory computer-readable medium storing computer executable code at a user equipment (UE), the code when executed by a processor causes the processor to:
    establish a connection with a base station;
    transmit, to the base station, a peak to average power ratio (PAPR) report indicating one or more parameters to adjust a PAPR of each analog to digital converter (ADC) of the UE; and
    receive, from the base station, a downlink signal having an adjusted PAPR based on the one or more parameters provided by the UE, wherein the one or more parameters to adjust the PAPR of the UE include at least one of:
    a number of antennas at the UE,
    a distance between adjacent antennas,
    an angle of arrival for a signal from the base station,
    an antenna beam width of the UE,
    a requested PAPR variance on an antenna array of the UE,
    a requested averaged PAPR for a subsequent transmission from the base station, or
    a requested maximum or a minimum PAPR for each antenna element of the UE.

51. A non-transitory computer-readable medium storing computer executable code at a user equipment (UE), the code when executed by a processor causes the processor to:
    establish a connection with a base station;
    transmit, to the base station, a peak to average power ratio (PAPR) report indicating one or more parameters to adjust a PAPR of each analog to digital converter (ADC) of the UE;
    receive, from the base station, a downlink signal having an adjusted PAPR based on the one or more parameters provided by the UE;
    determine a change in the PAPR of the UE; and
    transmit, to the base station, a requested PAPR for a subsequent transmission from the base station, wherein the UE transmits the requested PAPR in response to the change in the PAPR of the UE.

52. An apparatus for wireless communication at a base station, comprising:
    a memory; and
    at least one processor coupled to the memory and configured to:
        receive, from a user equipment (UE), a request to establish a connection;
        receive, from the UE, a peak to average power ratio (PAPR) report indicating one or more parameters to adjust a PAPR of each analog to digital converter (ADC) of the UE; and
        transmit, to the UE, a downlink signal having an adjusted PAPR based on the one or more parameters provided by the UE, wherein the one or more parameters to adjust the PAPR of the UE include at least one of:
        a number of antennas at the UE,
        a distance between adjacent antennas,
        an angle of arrival for a signal from the base station,
        an antenna beam width of the UE,
        a requested PAPR variance on an antenna array of the UE,
        a requested averaged PAPR for a subsequent transmission from the base station, or
        a requested maximum or a minimum PAPR for each antenna element of the UE.

53. An apparatus for wireless communication at a base station, comprising:
    means for receiving, from a user equipment (UE), a request to establish a connection;
    means for receiving, from the UE, a peak to average power ratio (PAPR) report indicating one or more parameters to adjust a PAPR of each analog to digital converter (ADC) of the UE; and
    means for transmitting, to the UE, a downlink signal having an adjusted PAPR based on the one or more parameters provided by the UE and PAPR reduction information from the base station.

54. An apparatus for wireless communication at a base station, comprising:
    means for receiving, from a user equipment (UE), a request to establish a connection;
    means for receiving, from the UE, a peak to average power ratio (PAPR) report indicating one or more parameters to adjust a PAPR of each analog to digital converter (ADC) of the UE; and
    means for transmitting, to the UE, a downlink signal having an adjusted PAPR based on the one or more parameters provided by the UE, wherein the one or more parameters to adjust the PAPR of the UE include at least one of:
    a number of antennas at the UE,
    a distance between adjacent antennas,
    an angle of arrival for a signal from the base station,
    an antenna beam width of the UE,
    a requested PAPR variance on an antenna array of the UE,
    a requested averaged PAPR for a subsequent transmission from the base station, or a requested maximum or a minimum PAPR for each antenna element of the UE.

55. An apparatus for wireless communication at a base station, comprising:
   means for receiving, from a user equipment (UE), a request to establish a connection;
   means for receiving, from the UE, a peak to average power ratio (PAPR) report indicating one or more parameters to adjust a PAPR of each analog to digital converter (ADC) of the UE;
   means for transmitting, to the UE, a downlink signal having an adjusted PAPR based on the one or more parameters provided by the UE; and
   means for receiving, from the UE, a requested PAPR for a subsequent transmission from the base station, wherein the base station receives the requested PAPR in response to a change in the PAPR of the UE.

56. A non-transitory computer-readable medium storing computer executable code at a base station, the code when executed by a processor causes the processor to:
   receive, from a user equipment (UE), a request to establish a connection;
   receive, from the UE, a peak to average power ratio (PAPR) report indicating one or more parameters to adjust a PAPR of each analog to digital converter (ADC) of the UE; and
   transmit, to the UE, a downlink signal having an adjusted PAPR based on the one or more parameters provided by the UE and PAPR reduction information from the base station.

57. A non-transitory computer-readable medium storing computer executable code at a base station, the code when executed by a processor causes the processor to:
   receive, from a user equipment (UE), a request to establish a connection;
   receive, from the UE, a peak to average power ratio (PAPR) report indicating one or more parameters to adjust a PAPR of each analog to digital converter (ADC) of the UE; and
   transmit, to the UE, a downlink signal having an adjusted PAPR based on the one or more parameters provided by the UE, wherein the one or more parameters to adjust the PAPR of the UE include at least one of:
   a number of antennas at the UE,
   a distance between adjacent antennas,
   an angle of arrival for a signal from the base station,
   an antenna beam width of the UE,
   a requested PAPR variance on an antenna array of the UE,
   a requested averaged PAPR for a subsequent transmission from the base station, or
   a requested maximum or a minimum PAPR for each antenna element of the UE.

58. A non-transitory computer-readable medium storing computer executable code at a base station, the code when executed by a processor causes the processor to:
   receive, from a user equipment (UE), a request to establish a connection;
   receive, from the UE, a peak to average power ratio (PAPR) report indicating one or more parameters to adjust a PAPR of each analog to digital converter (ADC) of the UE;
   transmit, to the UE, a downlink signal having an adjusted PAPR based on the one or more parameters provided by the UE; and
   receive, from the UE, a requested PAPR for a subsequent transmission from the base station, wherein the base station receives the requested PAPR in response to a change in the PAPR of the UE.

* * * * *